United States Patent
Puglisi

(10) Patent No.: US 12,460,460 B2
(45) Date of Patent: Nov. 4, 2025

(54) HOOD ASSEMBLY FOR A MOTOR VEHICLE AND PROCESS FOR THE MOUNTING THEREOF

(71) Applicant: FERRARI S.P.A., Modena (IT)

(72) Inventor: Gabriele Puglisi, Modena (IT)

(73) Assignee: FERRARI S.P.A., Modena (IT)

( * ) Notice: Subject to any disclaimer, the term of this patent is extended or adjusted under 35 U.S.C. 154(b) by 382 days.

(21) Appl. No.: 18/152,347

(22) Filed: Jan. 10, 2023

(65) Prior Publication Data

US 2023/0220711 A1    Jul. 13, 2023

(30) Foreign Application Priority Data

Jan. 13, 2022   (IT) .......................... 102022000000425

(51) Int. Cl.
| | | |
|---|---|---|
| *E05D 5/06* | (2006.01) | |
| *B62D 25/10* | (2006.01) | |
| *B62D 65/02* | (2006.01) | |
| *B62D 65/06* | (2006.01) | |
| *E05D 5/02* | (2006.01) | |
| *E05D 3/02* | (2006.01) | |

(52) U.S. Cl.
CPC .............. *E05D 5/062* (2013.01); *B62D 25/10* (2013.01); *B62D 65/024* (2013.01); *B62D 65/06* (2013.01); *E05D 5/0207* (2013.01); *E05D 3/02* (2013.01); *E05D 2005/067* (2013.01)

(58) Field of Classification Search
CPC ....... E05D 5/062; E05D 5/0207; B62D 25/10; B62D 25/105; B62D 25/12; B62D 65/06; B62D 65/024
See application file for complete search history.

(56) References Cited

U.S. PATENT DOCUMENTS

| | | | | |
|---|---|---|---|---|
| 2,479,437 A | * | 8/1949 | Vigmostad ............ | E05F 1/1276 16/289 |
| 3,232,368 A | * | 2/1966 | Sullivan ............... | B62D 25/105 55/385.3 |
| 3,815,176 A | * | 6/1974 | Porter .................... | E05D 3/145 16/388 |

(Continued)

FOREIGN PATENT DOCUMENTS

| | | |
|---|---|---|
| DE | 102005012833 B3 | 3/2006 |
| EP | 3620358 A1 | 3/2020 |
| GB | 2551143 A | 12/2017 |

OTHER PUBLICATIONS

Italian Search Report for Application No. 10102022000000425; Filing Date—Jan. 13, 2022; Date of Mailing—Aug. 31, 2022, 8 pages.

*Primary Examiner* — Jason S Morrow
(74) *Attorney, Agent, or Firm* — CANTOR COLBURN LLP

(57) ABSTRACT

A hood assembly for a motor vehicle includes a hood, a hinge with a first arm, and a pin fixed to the first arm in a projecting manner along a mounting axis and a second arm of the hood hinged to the first arm around a hinge axis, a structural member fixed to the pin and provided with a hole axially receiving the pin along the mounting axis, wherein the hinge axis and the mounting axis lie respectively on a first plane and on a second plane parallel to one another, and wherein a projection of the hinge axis onto the second plane is orthogonal to the mounting axis.

15 Claims, 3 Drawing Sheets

(56) References Cited

U.S. PATENT DOCUMENTS

| | | | | |
|---|---|---|---|---|
| 5,873,619 | A * | 2/1999 | Lewkoski | E05F 5/06 16/241 |
| 8,595,901 | B1 * | 12/2013 | Shaw | E05D 3/02 296/193.11 |
| 8,726,466 | B2 * | 5/2014 | Kim | E05D 5/062 296/193.11 |
| 9,994,192 | B2 * | 6/2018 | Narita | B62D 25/12 |
| 11,332,966 | B2 * | 5/2022 | Börjesson | E05D 5/0215 |
| 11,434,678 | B2 * | 9/2022 | Åberg | E05D 11/087 |
| 11,585,133 | B2 * | 2/2023 | Earl | E05D 5/0207 |
| 12,172,699 | B2 * | 12/2024 | Kowaczyk | E05D 13/003 |
| 2003/0159247 | A1 * | 8/2003 | Schott | E05D 7/04 16/244 |
| 2020/0284078 | A1 | 9/2020 | Prim et al. | |

* cited by examiner

HOOD ASSEMBLY FOR A MOTOR VEHICLE AND PROCESS FOR THE MOUNTING THEREOF

CROSS-REFERENCE TO RELATED APPLICATIONS

This patent application claims priority from Italian patent application no. 102022000000425 filed on Jan. 13, 2022, the entire disclosure of which is incorporated herein by reference.

TECHNICAL FIELD

The invention relates to a hood assembly for a motor vehicle, in particular a sports car, as well as a process for mounting the assembly on a chassis of the motor vehicle.

PRIOR ART

As known, the bodywork comprises the more external parts of a motor vehicle, which are, therefore, visible to the user. These parts typically also include the hoods, i.e., the tailgates arranged respectively to cover an engine and a trunk of the motor vehicle.

Usually, therefore, one of the hoods is located in an area at the front of the motor vehicle, while the other is located in an area at the back of the motor vehicle, according to the forward direction of the motor vehicle.

Each of the hoods is mounted on a chassis of the motor vehicle, hinging it to the chassis itself, i.e., via one or more hinges, typically two hinges arranged symmetrically to the sides of a vertical midplane of the motor vehicle.

More specifically, each of the hinges normally includes a pin that is fixed inside a corresponding hole made in the chassis. The pin enters the hole with radial clearance.

More precisely, the hole is made on a structural portion of the chassis, which extends horizontally and transversally to the forward direction for almost the whole lateral extension of the motor vehicle, i.e., until the areas in which the more external, lateral parts are fixed, for example the mudguards or the doors of the bodywork.

In some cases, the axis of the hole is oriented vertically; therefore, the position of the pin and, thus, of each of the hinges on a horizontal plane may be adjusted, before fastening the pin to the chassis, moving the pin horizontally inside the hole.

On the other hand, the vertical position of each of the hinges, i.e., the depth to which the pin is inserted in the hole, is adjusted by arranging one or more spacers between the pin and the chassis near the outside of the hole.

This type of adjustment of the hinge position in the cases indicated above is simply and effectively possible because the holes are positioned in intermediate areas of the motor vehicle, i.e., sufficiently distant from the lateral ends of the motor vehicle.

In fact, for this reason, the holes are relatively easily accessible to an operator, so that the operator can arrange the spacers comfortably.

The adjustment of the position of the hinges and, thus, of the hood is extremely important since the precision of the adjustment directly influences the size and visibility of the discontinuities between the externally visible parts of the bodywork.

To ensure strong aesthetics, minimising the visible empty spaces is essential, since a user should have a maximum perception of continuity between the externally visible parts of the bodywork. This can only be obtained with great precision of the adjustment of the position of the hinges.

For example, the type of adjustment described above ensures the precision required.

In general, the need is felt to move the holes for fastening the hinges at the lateral ends of the motor vehicle, in particular with the purpose of reserving the intermediate zones to receive other devices.

In any case, an application of the type of adjustment described above, near the lateral ends, becomes difficult due to a reduced accessibility of the angle areas between the structural portion that should carry the holes for fastening the hinges and the externally visible lateral parts.

As a result, the need is felt to identify at least one alternative way for adjusting the position of the hinges, in any case in the direction of maximising the simplicity and precision of adjustment, in particular when the hinges must be mounted near the lateral ends of the motor vehicle.

One purpose of the invention is that of meeting the latter need.

DESCRIPTION OF THE INVENTION

The purpose is achieved with a hood assembly and a mounting process as defined in the independent claims.

The dependent claims define particular embodiments of the invention.

BRIEF DESCRIPTION OF THE DRAWINGS

Below, an embodiment of the invention will be described to better understand the same by way of non-limiting example and with reference to the attached drawings in which.

EMBODIMENTS OF THE INVENTION

Figure 1:
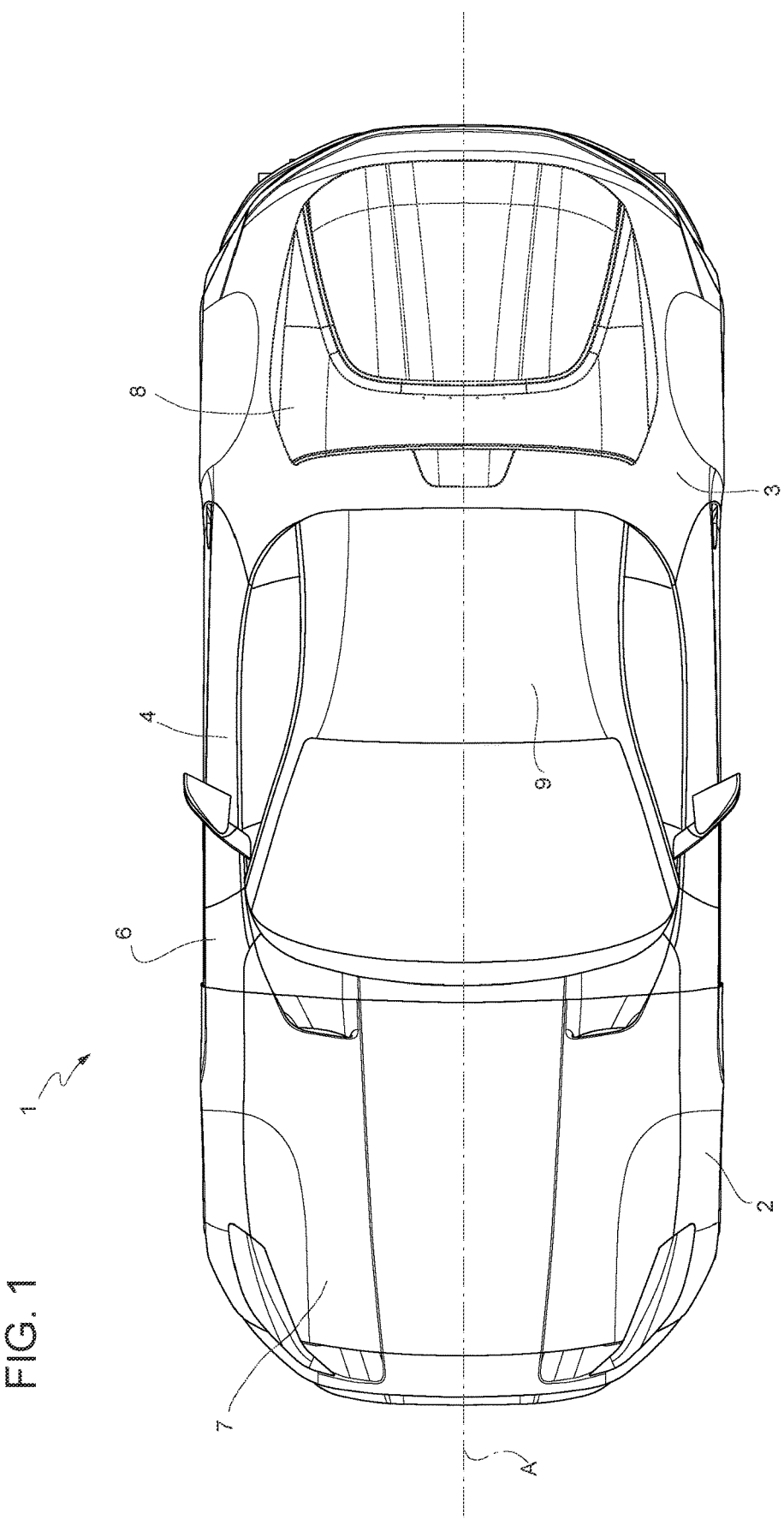
FIG. 1 is a plan view of a motor vehicle that comprises a hood assembly according to the invention.

In FIG. 1, the reference number 1 is used to indicate, as a whole, a motor vehicle.

The motor vehicle 1 has a front part 2 and a back part 3, according to its forward direction, represented in FIG. 1 via a straight longitudinal axis A. In addition, the motor vehicle 1 also comprises an intermediate part 4 between the front part 2 and the back part 3, according to the axis A. In addition, the motor vehicle 1 comprises a chassis 5, partially illustrated in FIG. 2, and a bodywork 6 fixed to the chassis 5 and, in turn, comprising a front hood 7, in the front part 2, as well as a rear hood 8, in the rear part 3.

As normally happens in the field of motor vehicles, the chassis 5 delimits an interior of the motor vehicle 1 in relation to an exterior of the same, as well as multiple typical compartments, i.e., an engine compartment, a passenger compartment for receiving the driver and one or more passengers, and a trunk for storing luggage.

The bodywork 6 has a covering or closing function in relation to the interior of the motor vehicle; more precisely, the hood 7 is suitable or configured for covering or closing the engine compartment, while the other hood 8 is suitable or configured for covering or closing the trunk. In addition, the bodywork 6 may comprise a roof panel 9, in the intermediate part 4, for or configured for covering or closing the passenger compartment.

Figure 2:
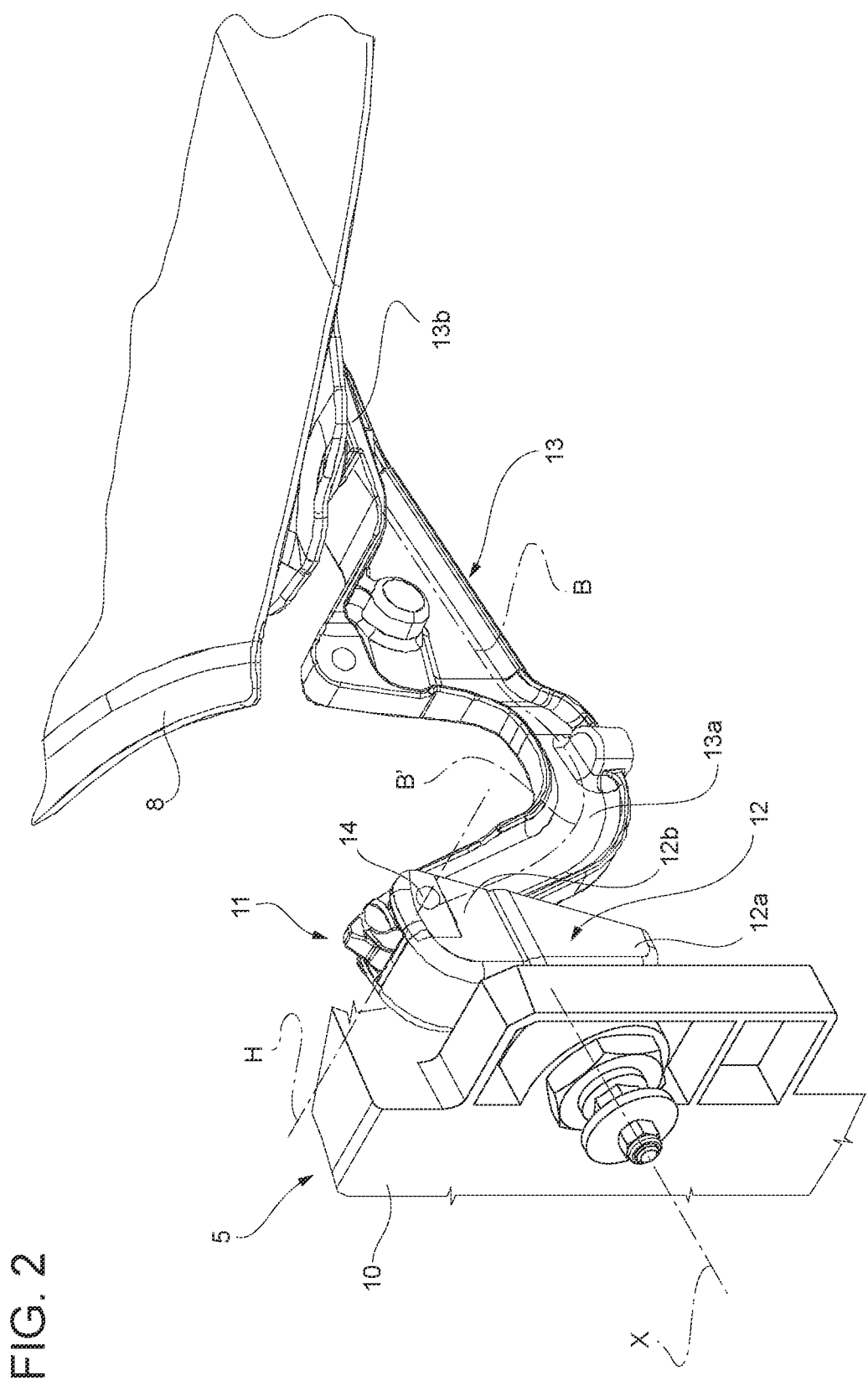
FIG. 2 is a perspective view, on an enlarged scale, of a portion of the hood assembly of the motor vehicle in FIG. 1.

The chassis 5 comprises, in more detail, two structures or structural members, of which one is typically known as a firewall (not illustrated), and the other is partially represented in FIG. 2 and herein indicated with the reference number 10.

The firewall is arranged between the passenger compartment and the engine compartment, so as to delimit the passenger compartment in relation to the engine compartment.

In detail, the structure 10 is arranged between the passenger compartment and the trunk, so as to delimit the passenger compartment in relation to the trunk. According to another example, the structure 10 could comprise the firewall, or could delimit the passenger compartment in relation to the engine compartment being arranged between the passenger compartment and the engine compartment.

The structure 10 extends transversely, more precisely orthogonally, to the axis A. The axis A lies on a horizontal plane, for which the structure 10 extends according to a plane that is vertical and orthogonal to the axis A. This does not mean that the structure 10 is limited to a flat structure.

Below, the description will only refer to the first hood 8, although what is described for the hood 8 is potentially applicable, with the necessary, logical alterations, to the second hood 7.

In FIG. 1, the hood 8 is covering or closing the trunk of the motor vehicle 1 so that it is found in a closed position, in which it covers or closes the trunk.

The motor vehicle 1 comprises multiple hinges 11, more precisely two hinges 11, configured to hinge the hood 8 to the structure 10, more precisely to a hinge axis H.

Therefore, the hood 8 can be rotated in relation to the axis H between the closed position and an open position, wherein the trunk is accessible from the outside of the motor vehicle 1.

The hinges 11 are redundant, since they hinge the hood 8 to the same axis H; therefore, the following description will refer only to one of the hinges 11, without prejudice to the fact that the above will also be applicable to another of the hinges 11.

The axis H is straight, more precisely horizontal, so that it may be coplanar to the axis A. In addition, the axis H is transverse to the axis A, more precisely orthogonal to it.

In addition, notwithstanding, a plane that is tangential to the hood 8 will intersect the horizontal plane comprising the axis H in an additional axis, which will be, in general, different to the axis H but, in any case, parallel to it or even coinciding with it, specifically transverse or, better, orthogonal to the axis A.

One of the hinges 11, from hereon in the hinge 11, comprises two bodies or arms 12, 13 hinged between them around the axis H.

In more detail, the hinge 11 also comprises a pin 14, which extends along the axis H, is supported by the arm 12 so that it rotates around the axis H, and is fixed in relation to the arm 13. Thus, the arm 13 rotates around the axis H together with the pin 14.

The arm 13 is fixed to the hood 8; in particular, the arm 13 is directly fixed to the hood 8.

The arm 13 extends between two opposite ends 13a, 13b, specifically along an axis B, more precisely according to a longitudinal direction, i.e., parallel to the axis A. In particular, the end 13b ends with the pin 14, for example consisting of a single piece with the end 13b, while the other end 13a is, more particularly, fixed to the hood 8.

The axis B has at least one curved, concave section B', in detail towards the horizontal plane comprising the axis H, in particular at the end 13b. More in particular, the axis B intersects the axis H in one point. The curved section B' defines what, in the technical jargon, is identified as a "gooseneck".

The axis B belongs to a plane orthogonal to the axis H, thus, in detail, vertical, as well as orthogonal to the plane according to which the structure 10 extends, i.e., parallel to the axis A.

Figure 4:
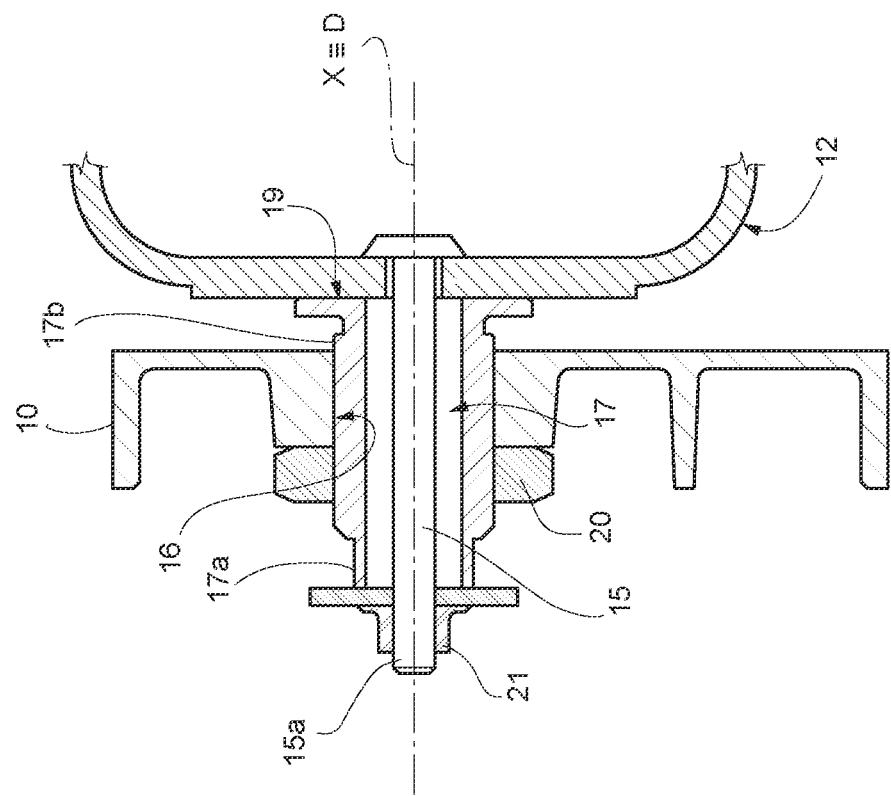
FIG. 4 is a cross-section of the portion in FIG. 2 according to a vertical plane parallel to a forward direction of the motor vehicle in FIG. 1.
Figure 3:
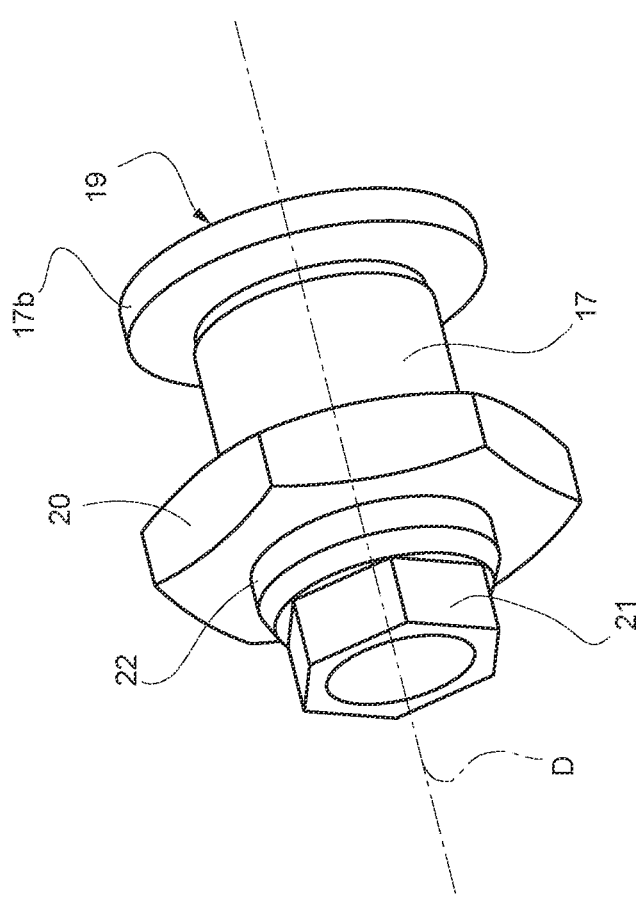
FIG. 3 is a perspective view, on an even more enlarged scale, of a detail of the portion in FIG. 2.

In addition, as can be seen in FIG. 4, the hinge 11 comprises another pin 15 fixed to the arm 12 so that it projects in relation to it along a mounting axis X. In this case, the pin 15 projects directly from the arm 12. For example, the pin 15 could consist of a single piece with the arm 12, or be fixed to it via various fastening means.

The arm 13 and the pin 15 preferably extend according to the axis X, or, more precisely, according to a plane orthogonal to the axis H and comprising the axis X, in particular starting from corresponding opposite ends 12a, 12b of the arm 12 according to the axis X.

In particular, the axis B and the axis X are coplanar.

From this it is clear, even if what follows represents an independent concept, that the axis X extends according to the axis A or is parallel, or basically parallel, to the axis A. In other words, the axis X is directed according to the forward direction of the motor vehicle.

The end 12a brings the pin 15, while the end 12b supports the pin 14 so it rotates around the axis H.

The pin 15 is fixed to the structure 10 and is arranged or inserted inside a hole 16 made on the structure 10. The hole 16, with which the structure 10 is provided, has an axis D parallel to the axis X. In FIG. 4, the axis X and the axis D coincide; in any case, this is non-limiting since the axes X and D do not, in general, coincide.

In fact, the pin 15 is inserted in the hole 16 with radial clearance, so that the radial position of the pin 15 illustrated in FIG. 4 is only an example and could be different, based on the assembly requirements of the motor vehicle 1.

In other words, the hole 16 axially receives the pin 15 along the axis X, or along a direction parallel to its axis D.

The hole 16 is located, in particular, on one end of the structure 10, more specifically next to an outer element of the bodywork 6, for example a mudguard or a side door.

As can be seen in FIG. 4, the hole 16 is a through hole, i.e., passing through the structure 10.

According to the invention, the axes H, X lie on corresponding parallel planes-a first and a second plane, respectively. The parallel planes may also coincide. In any case, in general, a projection of the axis H on the second plane is orthogonal to the axis X. Clearly, if the first and the second plane coincided, the axis H would be directly orthogonal to the axis X.

Thus, the first and the second plane are both horizontal. In other, alternative words, at least one of the first and the second plane or both the planes comprise the axis A or the forward direction of the motor vehicle 1.

The hood 8, the hinge 11, and the structure 10 are part of a hood assembly of the motor vehicle 1.

The hood assembly comprises means or devices for adjusting and fastening the position of the pin 15 in relation to the structure 10. Thus, the pin 15 is fixed to the structure 10 via these means or devices.

The adjusting and fastening assembly or means preferably comprise a sleeve 17, in particular for adjusting the position of the pin 15 along the axis X. Thus, the sleeve 17 defines a compensator to compensate for or record the position of the hinge along the axis X.

The sleeve 17 is arranged inside the hole 16, or is inserted in it. More precisely, the sleeve 17 is coaxial to the hole 16. In addition, the sleeve 18 axially receives the pin 15 inside of it. In other words, the pin 15 extends along the axis X parallel to the axis D, which is also of the sleeve 17, without necessarily being coaxial to it, even if FIG. 4 illustrates the latter, example configuration.

The sleeve 17 is fixed in relation to the structure 10 in a releasable manner.

In addition, preferably, the sleeve 17 completely crosses the hole 16. The sleeve 17 has precisely two axial ends 17a, 17b, in particular arranged outside the hole 16 at the axial sides (i.e., according to the axis D) opposite the hole 16 or the structure 10.

In addition, the end 17b defines, or more precisely axially ends, with a face 19 arranged so as to abut against the arm 12.

More specifically, the sleeve 17 has an external surface around the axis D; the external surface extends axially along the axis D and cooperates, in contact, with a surface delimiting the hole 16 around the axis D.

In particular, the external surface of the sleeve 17 is at least in part threaded, thus defining an outer thread of the sleeve 17. Correspondingly, the surface delimiting the hole 16 is also threaded, thus defining an inner thread of the hole 16, to which the outer thread is screwed. The end 17a comprises a portion of the outer thread.

This, in any case, is not strictly necessary, since the sleeve 17 could be coupled, so that it slides, in the hole 16 via a guide-slide type coupling, for example via a grooved coupling.

Although the sleeve 17 has an axial position fixed in relation to the axis X, the same axial position is also a position adjusted along the axis X.

This fact is clear from the example of the coupling between outer and inner thread: the screwing of the sleeve 17 into the hole 16 makes it possible to vary and thus adjust the reciprocal axial position between the sleeve 17 and the pin 15, i.e., the position of the sleeve 17 along the axis X.

This adjusted position is, in any case, fixed or locked, in particular using the above-mentioned adjustment and fastening means or devices.

In detail, the hood assembly or the adjustment and fastening means comprise a threaded locking nut 20, which is screwed into the outer thread of the sleeve 17 until it is tightened on the structure 10 outside the hole 16, thus locking the adjusted position of the sleeve 17.

In practice, the threaded locking nut 20 is screwed into the end 17a and has a ring-shaped face arranged transversely around the axis D and tightly in contact against a corresponding face of the structure 10 arranged transversely around the axis D.

Given that the face 19 is abutted against the arm 12, in particular already before the adjusted position is locked, the adjustment of the position of the sleeve 17 along the axis X corresponds to also adjusting the position of the body 12 and, thus, of the pin 15 of the hinge 11, and more generally, of the hood 8, always along the axis X.

Conveniently, the pin 15 entirely crosses the sleeve 17.

The pin 15 is fixed in relation to the sleeve 17, in particular fixed to the sleeve 17, more specifically via adjustment and fastening means.

In detail, the pin 15 has a threaded end 15a.

In addition, the hood assembly or the adjustment and fastening means comprise an additional threaded locking nut 21 screwed into the threaded locking nut 15a until being tightened on the sleeve 17, thus fastening the pin 15 to the sleeve 17.

In general, the expression "to be screwed on the" does not entail direct contact, but also includes the possibility of an indirect tightening, for example, in this case, via one or more washers 22 between the sleeve 17 and the threaded locking nut 21.

Here, the threaded locking nut 21 has a ring-shaped face arranged transversely around the axis X and tightened against a corresponding ring-shaped face of the end 17a, in detail indirectly via the washers 22. The ring-shaped face of the end 17a is arranged transversely around the axis D.

From the above, especially with reference to FIG. 4, it is clear that the pin 15 has a degree of freedom of radial translation inside the sleeve 17, before being fixed to it, in particular by tightening the threaded locking nut 21. This corresponds to the possibility of adjusting, for example manually, the position of the pin 15 and, thus, of the hinge 11 in relation to the two axes orthogonal to the axis X.

Vice versa, with the locking of the adjusted position of the sleeve 17, the pin 15 and the hinge 11 cannot be moved along the axis X, something that was possible before the adjusted position of the sleeve 17 was locked.

A process for mounting the hood assembly 4 is as follows.

In general, the process comprises the steps of axially inserting the pin 15 into the hole 16, adjusting the position of the pin 15 along the axis X, and fastening the pin 15 to the structure 10.

More specifically, adjusting the position of the pin 15 includes arranging the body 12, in relation to which the pin 15 is fixed, in a desired position along the axis X.

The pin 15 is translated along the axis X inside the sleeve 17, which was previously coupled to the hole 16 so as to cooperate in contact with the latter, in a mobile way according to the axis X. In particular, the outer thread of the sleeve 17 is engaged to the inner thread of the hole 16, so that screwing the sleeve 17 on the hole is possible to enable the adjustment of the axial position of the sleeve 17 in relation to the axis X.

In the desired position, the hood 8 rests on the chassis of the motor vehicle 1, so that it remains stable in the desired position, in particular in expectation of the step for fastening the pin 15 to the structure 10.

At this point, the step of fastening the pin 15 to the structure 10 includes bringing the face 19 to abut against the arm 12, thus axially adjusting the position of the sleeve 17 according to the axis X through the hole 16. In the meantime, the pin 15 remains inserted in the sleeve 17.

Thus, once the position of the sleeve 17 is adjusted according to the axis X, the step of fastening the pin 15 to the structure 10 includes fastening the sleeve 17 to the structure 10 in a releasable manner in the axially adjusted position.

This, in particular, occurs by screwing the threaded locking nut 20 to the portion of outer thread of the end 17a until tightening the threaded locking nut 20 against the sleeve 17.

Here, the hinge 11 is fixed in relation to the axis X, but its position may still be adjusted in relation to the two axes orthogonal to the axis X.

Thus, the step of fastening the pin 15 to the structure still includes a step for adjusting the position of the pin 15 in relation to the two axes orthogonal to the axis X, thus bringing the pin 15 and the hinge 11 to a final position.

Thus, the step of fastening the pin 15 is completed with the actual fastening of the pin 15 to the sleeve 17, after which the latter was fastened to the structure 10.

This, in particular, occurs by screwing the threaded locking nut 21 to the threaded end 15a until tightening the threaded locking nut 21 against the sleeve 17, more precisely against the end 17a.

From the above, the advantages of the assembly 4 and the process according to the invention are clear.

In particular, since the structure 10 conceptually divides the trunk from the passenger compartment of the motor vehicle 1, the mounting manoeuvres are almost all carried out on the side of the passenger compartment and, therefore, in an area that is easily accessed by the operator. In fact, the threaded locking nuts 20, 21 are both situated on the side axially opposite the structure 10 in relation to the side in which the arms 12, 13 hinged together and the hood 8 are hinged.

In addition, the hood assembly clearly allows the adjustment of the position of the hinge 11 along the axis X and also along the two axes orthogonal to it with basically infinite precision, since the pin 15 can be moved inside the sleeve 17 with continuity in a simple way.

The possibility of axially moving the sleeve 17 via the coupling between its outer thread and the inner thread of the hole 16 contributes t to maximising the adjustment precision.

In addition, fastening the pin 15 to the structure 10 is simple and effective since it occurs by only maneuvering the threaded locking nuts 20, 21.

Lastly, it is clear that modifications may be made to the hood assembly and process, and variations produced thereof, according to this invention, without departing from the scope of protection defined by the claims.

The invention claimed is:

1. A hood assembly for a motor vehicle, the hood assembly comprising
    a hood suitable for covering a compartment of the motor vehicle,
    a hinge comprising a first arm, a pin fixed to the first arm in a projecting manner relative to the first arm along a mounting axis and a second arm fixed to the hood and hinged to the first arm around a hinge axis, so that the hood can be rotated around the hinge axis,
    a structural member fixed to the pin and provided with a hole, the hole axially receiving the pin along the mounting axis, and
    a sleeve fixed to the structural member in a releasable manner inside the hole and in an axially adjusted position along the mounting axis, wherein the sleeve goes through the hole and axially receives the pin, the sleeve having an end defining a face arranged so as to abut against the first arm,
    wherein the hinge axis and the mounting axis lie respectively on a first plane and on a second plane parallel to one another,
    wherein a projection of the hinge axis onto the second plane is orthogonal to the mounting axis.

2. The hood assembly according to claim 1, wherein said hole is a through hole going through the structural member.

3. The hood assembly according to claim 1, wherein the sleeve has an outer thread.

4. The hood assembly according to claim 1 and further comprising a first threaded locking nut screwed onto the outer thread up to be tightened on the structural member on the outside of the hole, thereby locking the position of the sleeve, in a releasable manner.

5. The hood assembly according to claim 3, wherein the hole has an inner thread to which the outer thread of the sleeve is screwed.

6. The hood assembly according to claim 1, wherein the pin entirely goes through the sleeve with a radial clearance and ends with a threaded end, the assembly further comprising a second threaded locking nut screwed onto the threaded end up to be tightened on the sleeve, thereby fixing the pin to the sleeve.

7. The hood assembly according to claim 1, wherein the structural member extends according to a third plane orthogonal to the mounting axis, the structural member being configured to be arranged between a trunk and a passenger compartment of the motor vehicle, so as to delimit the passenger compartment relative to the trunk.

8. The hood assembly according to claim 1, wherein the second arm and the pin extend according to the mounting axis starting from respective ends of the first arm, the ends being opposite according to the mounting axis.

9. A motor vehicle comprising the hood assembly according to claim 1.

10. The motor vehicle according to claim 9, wherein the mounting axis extends according to a forward direction of the motor vehicle or is parallel to the mounting axis.

11. The motor vehicle according to claim 9, wherein the first and the second plane are horizontal or comprise the forward direction.

12. A process for mounting a hood assembly according to claim 1, the process comprising the steps of
    axially inserting the pin into the hole,
    adjusting the position of the pin along the mounting axis, and
    fixing the pin to the structural member.

13. The process according to claim 12, wherein the step of fixing the pin to the structural member comprises the steps of
    causing the face of the end of the sleeve to abut against the first arm by axially adjusting the position of the second sleeve according to the mounting axis through the hole and with the pin axially inserted in the sleeve, and
    fixing the sleeve to the structural member in a releasable manner in the axially adjusted position.

14. The process according to claim 13, wherein the step of fixing the pin to the structural member further comprises the step of fixing the pin to the sleeve after the step of fixing the sleeve to the structural member.

15. A hood assembly for a motor vehicle, the hood assembly comprising a hood suitable for covering a compartment of the motor vehicle,
    a hinge comprising a first arm, a pin fixed to the first arm in a projecting manner relative to the first arm along a mounting axis and a second arm fixed to the hood and hinged to the first arm around a hinge axis, so that the hood can be rotated around the hinge axis,
    a structural member fixed to the pin and provided with a hole, the hole axially receiving the pin along the mounting axis, wherein the structural member extends according to a third plane orthogonal to the mounting axis, the structural member being configured to be arranged between a trunk and a passenger compartment of the motor vehicle, so as to delimit the passenger compartment relative to the trunk,
    wherein the hinge axis and the mounting axis lie respectively on a first plane and on a second plane parallel to one another, and wherein a projection of the hinge axis onto the second plane is orthogonal to the mounting axis.

* * * * *